under July 28, 1931                                           1,816,388

UNITED STATES PATENT OFFICE

ALWIN MITTASCH, OF LUDWIGSHAFEN-ON-THE-RHINE, RICHARD LUCAS, OF MANN-HEIM, AND ROBERT GRIESSBACH, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY

METHOD OF PRODUCING FINELY DIVIDED METAL OXIDES

No Drawing. Application filed May 20, 1925, Serial No. 31,691, and in Germany May 23, 1924.

This invention relates to metal oxides in a state of extremely fine division and a process for their manufacture. The latter consists in burning a volatilizable carbonyl or halide of a metallic element in the presence of a volatilizable, or gaseous combustible matter. The term metallic element is intended to include metals such as iron, chromium, aluminium, titanium and others, and also silicon which as an element has a metallic character. The combustible matter necessary for the combustion may be an inflammable gas or vapour and suitably mixed with the volatilizable metal compound or it may be chemically combined with the metallic element to form a compound of both a volatilizable and combustible character, as is the case in a metal carbonyl.

As an important example in accordance with the invention we mention the combustion of iron carbonyl which allows of the manufacture of a highly dispersed iron oxide capable of many valuable uses, for example as a mineral pigment colouring matter or as a polish or as a catalyst, or for the preparation of a very pure and finely divided metallic iron or other purposes. For effecting combustion, iron carbonyl vapours may be ignited in the air without or with an addition of inflammable gases or vapours. Or iron carbonyl may be mixed with a combustible liquid, such as alcohol and the mixture ignited, and a very suitable method consists in making iron carbonyl either alone or mixed with alcohol, or other liquids, into a spray in a nozzle by means of air, or oxygen, and igniting the spray. Catalysts, for example platinized asbestos, may be used for promoting ignition, or combustion.

For example, iron pentacarbonyl is atomized by means of compressed air, or other gas containing oxygen, in a suitable nozzle, and the mixture introduced in a fireproof pipe which is electrically, or otherwise, heated to about 500 degrees centigrade. Air, or oxygen, is best employed in ample excess. The reaction takes place at once, and when the operation is continued for a greater length of time, it may become necessary to provide for a withdrawal of heat.

The iron oxide formed is for the greater part, owing to its high specific volume, carried along with the gas current and can be separated in a chamber provided with several floors consisting of, or bearing filtering material. The particles are here separated in accordance with their size while the gases of combustion leave the chamber. Depending on the temperature of the combustion, and the duration of their stay in the combustion chamber, the oxide is obtained in varying degrees of dispersion and different reddish shades which may be further altered by proper aftertreatment, for example, calcining at low red heat.

Its very low apparent specific gravity is shown by the fact that 25 grams of it in a loose form fill a space of about 100 cubic centimetres and more (up to about 1,000 cubic centimetres) which test is best made after passing the powder through an 80 mesh sieve. Its particles have a size of 150 $\mu\mu$, or less. For the determination of the size of the particles 0.01 gram of the product is triturated for 5 minutes with 10 cubic centimetres of glycerol in a china mortar and measurement made with the cardioid-ultra-miscroscope (Siedentopf and Zsigmondy). The particles are also differentiated by representing more cloudy flakes instead of the sharply edged particles of ordinary iron oxide.

The iron carbonyl may be mixed with other metal carbonyls, or other metal carbonyls may be employed alone. Also, metal halide may be used and generally volatilizable metal compounds, in which cases combustible matter must be added separately. For example such compounds as ferric chloride, chromyl chloride, aluminium chloride, silicon tetrachloride, titanium chloride, or mixtures of such compounds, may be brought into a flame in a finely divided condition, in which flame besides non-volatile powders may be introduced for shading the product.

For example, purified coal gas is loaded with titanium chloride vapours and ignited in the air. Highly dispersed titanic acid oxide is produced which can be precipitated in dust chambers with the aid, if desired, of high tension electric discharges. Or, two vessels are intercalated each in a current of water gas, one containing iron carbonyl, the other silicon tetrachloride. The two gas currents loaded with the metal compounds are mixed and ignited in the air. A fine powder of flesh-colour is obtained which may be used as a pigment. Its shades can be varied by altering the proportions of the two gas currents or the amount of volatilized compound, for example by regulated heating.

We do not claim in this application the conversion of metal halides alone into finely divided metal oxides, this process being claimed in the divisional application, but what we claim is:

1. The process of producing a finely divided oxide of a metallic element which comprises burning a volatile metal carbonyl and a volatile halide of a metallic element distributed in an atmosphere of oxidizing gas in a flame produced with a gasified combustible matter.

2. The process of producing a finely divided oxide of a metallic element which comprises thoroughly distributing a volatile metal carbonyl in an excess of an oxidizing gas, and burning the resulting mixture to precipitate the metal oxide in finely divided form.

3. The process of producing finely divided iron oxide which comprises thoroughly distributing iron penta-carbonyl in an excess of oxygen and burning the resulting mixture to precipitate iron oxide in finely divided form.

In testimony whereof we have hereunto set our hands.

ALWIN MITTASCH.
RICHARD LUCAS.
ROBERT GRIESSBACH